(12) United States Patent
Hongo (10) Patent No.: US 10,505,596 B2
(45) Date of Patent: Dec. 10, 2019

(54) WIRELESS COMMUNICATION SYSTEM

(71) Applicant: Hitachi Kokusai Electric Inc., Minato-ku (JP)

(72) Inventor: Naoki Hongo, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/136,302

(22) Filed: Sep. 20, 2018

(65) Prior Publication Data

US 2019/0020385 A1    Jan. 17, 2019

Related U.S. Application Data

(63) Continuation-in-part of application No. PCT/JP2016/063145, filed on Apr. 27, 2016.

(51) Int. Cl.

| | | |
|---|---|---|
| H04L 1/02 | (2006.01) | |
| H04B 7/0413 | (2017.01) | |
| H04B 7/04 | (2017.01) | |
| H04L 25/49 | (2006.01) | |
| H04L 27/36 | (2006.01) | |

(Continued)

(52) U.S. Cl.
CPC ............ *H04B 7/0413* (2013.01); *H04B 7/04* (2013.01); *H04B 7/0691* (2013.01); *H04B 7/0874* (2013.01); *H04L 25/4917* (2013.01); *H04L 27/367* (2013.01)

(58) Field of Classification Search
CPC ...... H04B 7/0413; H04B 7/04; H04B 7/0691; H04B 7/0874; H04L 25/4917; H04L 27/367

USPC ......................................... 375/267, 299, 347
See application file for complete search history.

(56) References Cited

U.S. PATENT DOCUMENTS

2010/0167769 A1* 7/2010 Lorgeoux ............. H04B 7/0408
                                                      455/500

FOREIGN PATENT DOCUMENTS

| JP | 2007-184797 A | 7/2007 |
|---|---|---|
| JP | 2014-27347 A | 2/2014 |

(Continued)

OTHER PUBLICATIONS

International Search Report and Written Opinion from International Application No. PCT/JP2016/063145 dated Jun. 21, 2016.

*Primary Examiner* — Tesfaldet Bocure (74) *Attorney, Agent, or Firm* — Brundidge & Stanger, P.C.

(57) ABSTRACT

A wireless communication system having a plurality of antennas is disclosed. A combination of transmission antennas and reception antennas is selected, the combination allowing Φ to be the closest to π radians, where Φ represents an absolute value of an angle obtained by subtracting φ2 from φ1, where φ1 represents an angle formed by signal vectors transmitted from an i-th and a j-th transmission antennas of the first wireless device on an orthogonal plane on which a reception signal of a k-th reception antenna of the second wireless device is quadrature-detected or demodulated, and φ2 represents an angle formed by the signal vectors transmitted from the i-th and the j-th transmission antennas of the first wireless device on an orthogonal plane on which a reception signal of an l-th reception antenna of the second wireless device is quadrature-detected or demodulated.

12 Claims, 9 Drawing Sheets

(51) Int. Cl.
*H04B 7/06* (2006.01)
*H04B 7/08* (2006.01)

(56) References Cited

FOREIGN PATENT DOCUMENTS

JP    2014-131181 A    7/2014
WO    WO-2017187541 A1 * 11/2017 ........... H04B 7/0413

* cited by examiner

WIRELESS COMMUNICATION SYSTEM

CROSS-REFERENCE TO RELATED APPLICATION

The present application is a continuation-in-part application under 35 U.S.C. § 111(a) of International Application No. PCT/JP2016/063145, filed Apr. 27, 2016. The content of this application is incorporated herein by reference in its entirety.

TECHNICAL FIELD

The present invention relates to a wireless communication system, and is applicable to a wireless system using a MIMO transmission technology for transmitting and receiving a plurality of streams using a plurality of antennas, for example.

BACKGROUND ART

In recent years, the traffic of mobile communication has been increasing as mobile phones have become more sophisticated, and it is desired to implement further higher speed wireless communication in a limited frequency band. One of methods to implement this is a multiple-input multiple-output (MIMO) transmission technology (for example, JP 2014-131181 A). In MIMO transmission, a plurality of signal sequences are transmitted from a plurality of transmission antennas at the same time and at the same frequency, and spatial multiplexing is performed. By utilizing the multipath environment between the respective transmission antennas and reception antennas, signal processing is performed on a reception machine side to separate and decode each signal. As a result, without expanding a frequency bandwidth to be used, the capacity of the transmission path can be increased in proportion to the number of transmission and reception antennas. In other words, the frequency utilization efficiency can be improved. In mobile communication, which is not a line-of-sight communication system, a reception machine receives a plurality of signals by reflection from the surroundings. This propagation environment varies with time due to movement of a moving object using the system or an object causing scattering in the surroundings. In the case of using a plurality of antennas at such intervals that the above propagation environment can be regarded as independent, this is equivalent to a situation where a plurality of transmission paths exists. Thus, a plurality of independent signals corresponding to the number of antennas can be transmitted in the same frequency band.

In the situation where radio frequencies of the microwave band are tight along with the increasing traffic of mobile communication, it is required to increase the transmission capacity using high frequency bands such as the millimeter wave band. Comparing millimeter wave band communication to microwave band communication, there is an advantage in millimeter wave band communication that the millimeter wave band communication is suitable for increasing the capacity since signals in relatively wider bands can be handled; however, there are also disadvantages that it is difficult to perform large-power amplification and that the communication distance becomes shorter since the propagation loss is large. As a countermeasure against the above, there is a beamforming technique that performs spatial synthesis using a plurality of antenna elements. This is a technique of controlling the phase of transmission signals output from a plurality of antenna elements on the transmission side such that in-phase synthesis that maximized the power is performed in a reception machine. As the number of antenna elements increases, a directivity of the main lobe becomes sharper with side lobes in other directions attenuating. Therefore, the beamforming technique attracts attention also as an interference suppression technique. As an interval between antenna elements, $\lambda/2$ ($\lambda$: wavelength) is suitable. In the millimeter wave band of short wavelength, a relatively small antenna unit can be implemented.

CITATION LIST

Patent Literature

Patent Literature 1: JP 2014-131181 A

SUMMARY OF INVENTION

Technical Problem

However, when directivity is strengthened by the beamforming technology, coexistence with the MIMO transmission becomes difficult. Since line-of-sight communication occurs and sufficient multipath cannot be obtained, correlation of signals transmitted from multiple antennas is large. Therefore, a plurality of transmission paths cannot be assumed, and a transmission capacity proportional to the number of antennas cannot be expected.

In the 5th generation mobile communication system, a target of 10 Gbps is set as the transmission rate by around 2020. In order to achieve the target, it is indispensable to achieve both broadband and MIMO transmission technology, and a technology to implement these is desired.

An object of the present disclosure is to provide a wireless communication system suitable for MIMO transmission.

Other problems and novel features will be apparent from the description of this specification and the accompanying drawings.

Solution to Problem

An outline of a representative embodiment of the present disclosure will be briefly described as follows.

That is, a wireless communication system includes a first wireless device having a plurality of antennas for performing wireless communication and a second wireless device having a plurality of antennas. At least one of the first wireless device and the second wireless device selects two antennas from among three or more antennas and performs 2×2 MIMO communication. A combination of transmission antennas and reception antennas is selected, the combination allowing $\Phi$ to be the closest to $\pi$ radians, where $\Phi$ represents an absolute value of an angle obtained by subtracting $\varphi 2$ from $\varphi 1$, where $\varphi 1$ represents an angle formed by signal vectors transmitted from an i-th and a j-th transmission antennas of the first wireless device on an orthogonal plane on which a reception signal of a k-th reception antenna of the second wireless device is quadrature-detected or demodulated, and $\varphi 2$ represents an angle formed by the signal vectors transmitted from the i-th and the j-th transmission antennas of the first wireless device on an orthogonal plane on which a reception signal of an l-th reception antenna of the second wireless device is quadrature-detected or demodulated.

Advantageous Effects of Invention

According to the wireless communication system described above, the transmission rate can be improved.

DESCRIPTION OF EMBODIMENTS

First, an MIMO wireless communication system will be described with reference to FIG. 1.

A wireless communication system 10 includes a first wireless device 110 and a second wireless device 120. The first wireless device 110 has a first antenna (ANT 1) and a second antenna (ANT 2). The second wireless device 120 has a third antenna (ANT 3), a fourth antenna (ANT 4), phase shifters (π/2 units) 121 and 122, and adders 123 and 124.

Figure 1:
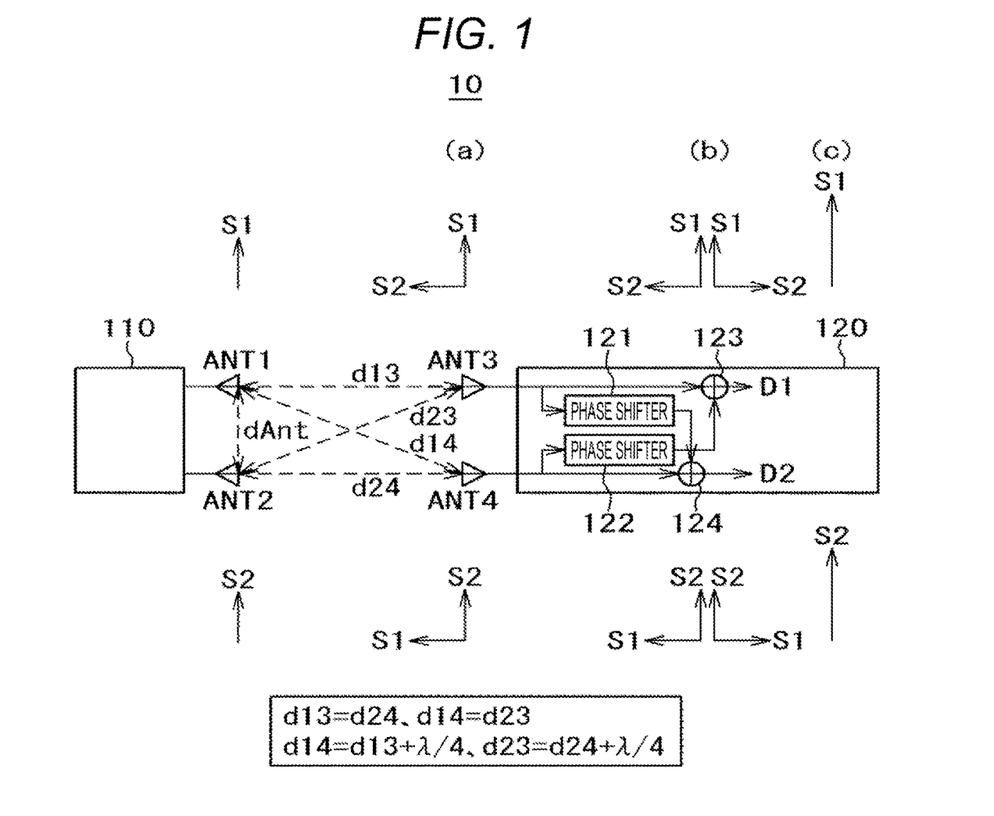
FIG. 1 is a diagram for explaining an MIMO wireless communication system.

Some Patent Literatures disclose as a known technology that, as illustrated in FIG. 1, when a radio frequency of a wavelength λ, a transmission distance, and an antenna interval (dAnt) satisfy the following condition in an MIMO technology in line-of-sight communication, a plurality of independent communication paths can be assumed.

When the transmission distance is denoted by R, the distance between the first antenna (ANT 1) and the third antenna (ANT 3) by d13, and the distance between the second antenna (ANT 2) and the fourth antenna (ANT 4) by d24, where R=d13=d24, the wireless communication system 100 allows an antenna installation interval to be dAnt such that a differential transmission path when signals transmitted from the two antennas on the transmission side of the first antenna (ANT 1) and the second antenna (ANT 2) are received by the third antenna (ANT 3) and the fourth antenna (ANT 4) on the reception side becomes λ/4 and allows a phase difference between the signal (S1) and the signal (S2) transmitted from the two antennas to be π/2. When combining the signals of the two reception antennas, by performing phase rotation by the phase shifters 121 and 122 and synthesis by the adders 123 and 124 such that one of the signals has emphasized S1 and cancelled S2 while the other one of the signals has emphasized S2 and cancelled S1, the signals can be separated into two signals (D1 and D2). When the distance between the first antenna (ANT 1) and the fourth antenna (ANT 4) by d14, and the distance between the second antenna (ANT 2) and the third antenna (ANT 3) by d23, the optimum condition for complete separation can be obtained from the following equations.

$$d13=d24$$

$$d14=d23$$

$$d14=d13+\lambda/4$$

$$d23=d24+\lambda/4$$

$$d\text{Ant}=(d14^2-d13^2)^{1/2}$$

Particularly with millimeter waves, since the wavelength λ is short, implementation is possible with a practical antenna interval of several centimeters to several meters.

In the case of fixed communication, antenna arrangement depending on a propagation distance can be designed beforehand; however in the case of mobile communication, it is impossible to always achieve the optimal antenna arrangement since a distance between wireless devices changes as one or more wireless devices move.

Figure 2A:
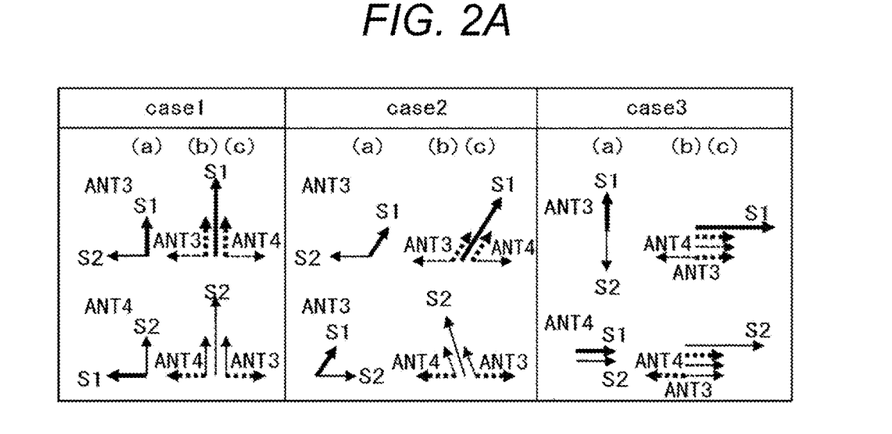
FIG. 2A is a diagram for explaining a phase relationship of reception signals when a wireless device moves.
Figure 2B:
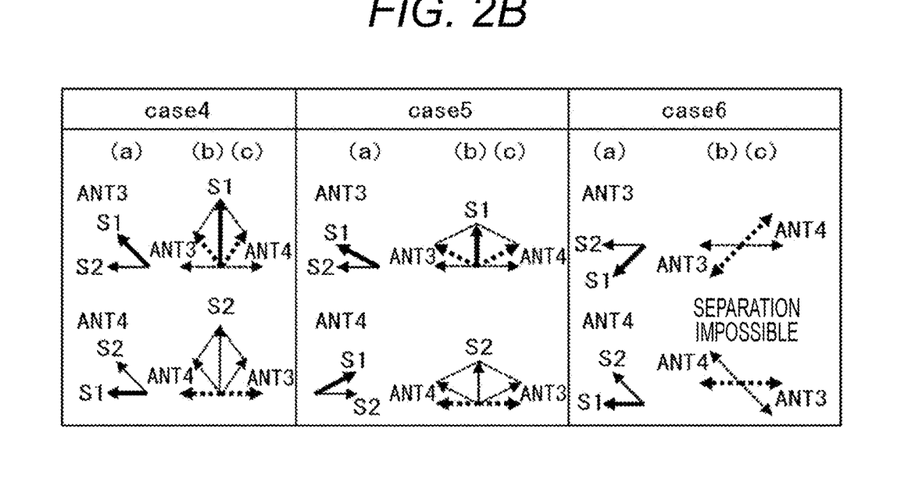
FIG. 2B is a diagram for explaining a phase relationship of reception signals when the wireless device moves.

Next, a phase relationship of reception signals when a wireless device moves will be described with reference to FIGS. 2A and 2B. FIG. 2A is a diagram illustrating cases of ideal synthesis. FIG. 2B is a diagram illustrating exemplary cases in which the amplitude after signal separation attenuates. Case 1 in FIG. 2A is equivalent to that of FIG. 1. Point (a) in FIG. 1 corresponds to (a) in FIGS. 2A and 2B and has vectors indicating a phase relationship received by the third antenna (ANT 3) and the fourth antenna (ANT 4). The vectors of a reception signal is determined by a relationship among a wavelength and d13, d14, d23, and d24 which are distances between one of the first antenna (ANT 1) and the second antenna (ANT 2) and one of the third antenna (ANT 3) and the fourth antenna (ANT 4). Point (b) of FIG. 1 is indicated by a dotted line at (b) of FIGS. 2A and 2B, and has vectors the phase of which is adjusted by the phase shifters 121 and 122 in order to separate signals. Point (c) in FIG. 1 is indicated by a solid line at (c) of FIGS. 2A and 2B and has a vector obtained by combining the signals of (b). Case 1 to case 3 in FIG. 2A represent ideal synthesis cases, and the amplitude of a signal is doubled at (c). In case 4 to case 6 in FIG. 2B, the amplitude of signals after signal separation becomes small, that is, the S/N ratio becomes small, and thus the signal quality is deteriorated. In the worst case, signal separation is impossible as illustrated in case 6, the effect of the MIMO of increasing the transmission capacity cannot be achieved. Therefore, one signal sequence must be transmitted.

In a wireless communication system according to an embodiment, antennas suitable for MIMO transmission are selected from a plurality of transmission antennas or a plurality of reception antennas or from both of them. Moreover, when conditions for MIMO (multistream) transmission are not satisfied, switching to single signal sequence (singlestream) transmission is performed.

According to the present embodiment, it is possible to improve the transmission rate by selecting optimal two antennas from three or more antennas and suppressing signal quality deterioration by multistream transmission of line-of-sight communication. In addition, when conditions enabling transmission of a multistream are not satisfied, the optimum transmission rate can be implemented by switching to singlestream transmission.

In this specification, a unit for transmitting or receiving one stream is referred to as "antenna", and a unit for beamforming is referred to as "antenna element". An "antenna" for transmitting a beamformed signal includes a plurality of "antenna elements". A unit used in MIMO transmission is "antenna".

Hereinafter, embodiments will be described with reference to the drawings. Note that in the following description the same symbol is given to the same component, and repetitive explanation may be omitted.

Embodiments

Figure 11:
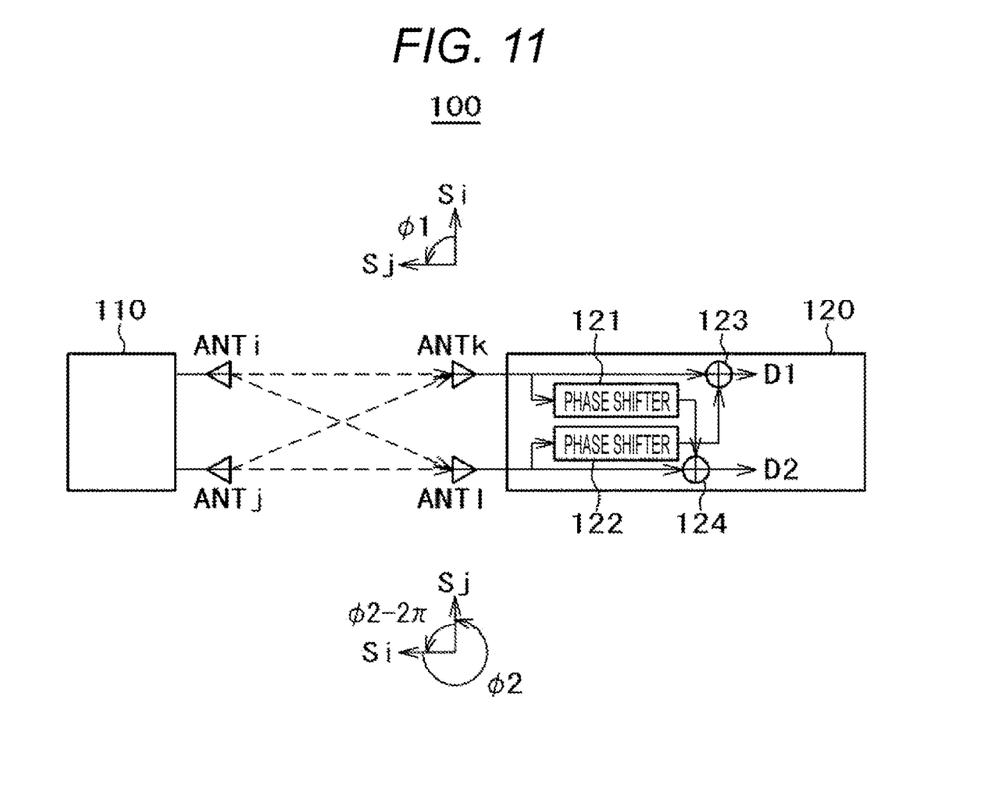
FIG. 11 is a diagram illustrating a configuration of a wireless communication system according to an embodiment.

First, a wireless communication system according to an embodiment will be described with reference to FIG. 11. FIG. 11 is a block diagram illustrating a wireless communication system according to an embodiment. A wireless communication system 100 according to the embodiment has a similar configuration to that of the wireless communication system 10 in FIG. 1.

Next, a method of selecting two antennas from three or more antennas will be described. Let M be the number of antennas of a first wireless device 110 and N be the number of antennas of a second wireless device 120. Here, it is assumed that the conditions of M≥2, N≥2, and M+N≥5 are satisfied. For the purpose of explanation, a case where the first wireless device 110 transmits and the second wireless device 120 receives is assumed. In a reception signal of a k-th antenna (ANTk) of the second wireless device 120, an angle formed by signal vectors transmitted from an i-th antenna (ANTi) and a j-th antenna (ANTj) of the first wireless device 110 is denoted by φ1. In a reception signal of an l-th antenna (ANTl) of the second wireless device 120, an angle formed by signal vectors transmitted from the i-th antenna (ANTi) and the j-th antenna (ANTj) of the first wireless device 110 is denoted by φ2.

$$\Phi(i,j,k,l) = \text{abs}(\varphi 1 - \varphi 2) \quad (1)$$

The above equation is calculated for all the combinations of the transmission antennas (ANTi, ANTj) and the reception antennas (ANTk, ANTl). Where, abs ( ) represents an absolute value. Transmission antennas and reception antennas of a combination that is closest to π are selected from all Φs.

Figure 7A:
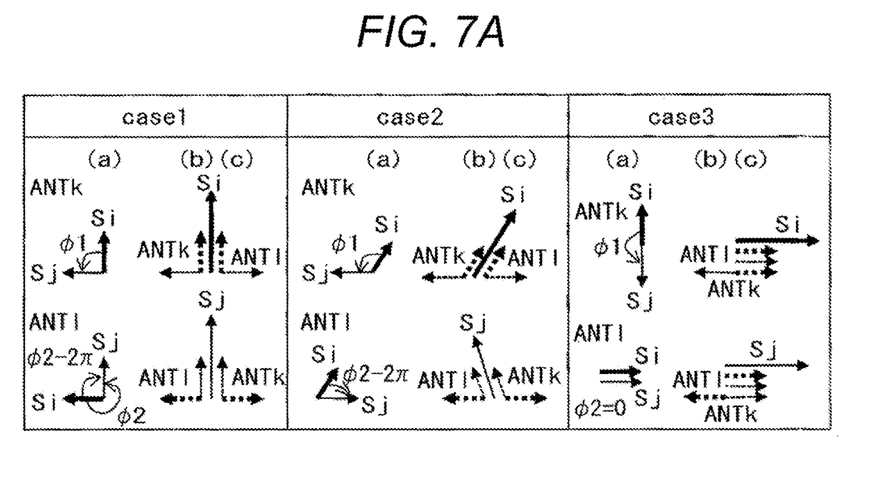
FIG. 7A is a diagram for explaining antenna selection according to the embodiment.
Figure 7B:
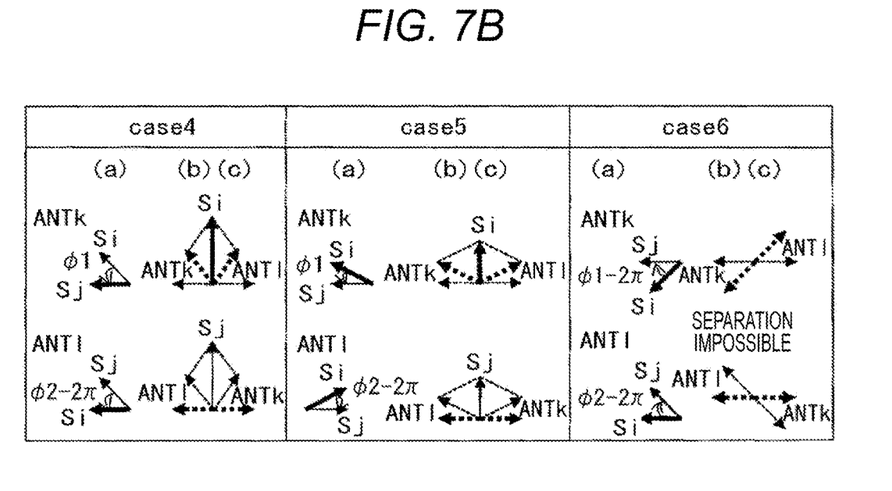
FIG. 7B is a diagram for explaining antenna selection according to the embodiment.

FIGS. 7A and 7B are diagrams illustrating examples of antenna selection. Each antenna of the k-th reception antenna (ANTk) and the l-th reception antenna (ANTl) of the second wireless device 120 respectively receives a synthesized signal in a space, the synthesized signal being synthesized the transmission signal (Si) of the i-th transmission antenna (ANTi) and the transmission signal (Sj) of the j-th transmission antenna (ANTj) of the first wireless device. For each case, Φ is calculated by equation (1). Here, it is assumed that the counterclockwise direction represents an advance (+) of a phase and the clockwise direction represents a delay (−) of a phase. Also, 2π=0, π=−π, etc. are used. In FIGS. 7A and 7B, Φ (case 1)=Φ (case 2)=Φ (case 3)=π, Φ (case 4)=2π/3, Φ (case 5)=π/3, and Φ (case 6)=0 hold. Therefore, either one of case 1, case 2, or case 3 may be selected.

Vectors of each of the reception signals illustrated in FIGS. 7A and 7B are represented in a rectangular coordinate system obtained by orthogonal detection in the case of single carrier transmission, back-diffusion in the case of code division multiple access (CDMA), and demodulation in case of orthogonal frequency division multiplexing (OFDM). In order to obtain vectors of a reception signal on the reception side, it is only required to transmit known signals orthogonal (mutually independent) to each other in terms of frequency or time domain from transmission antennas. As an example of such signals, pilot signals for channel estimation used in MIMO transmission may be used.

Figure 8:
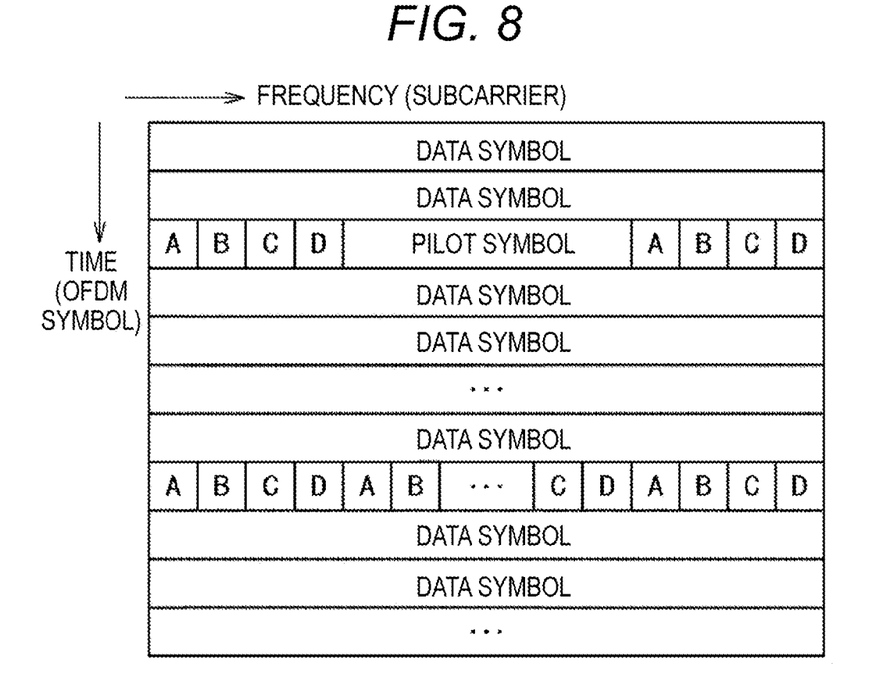
FIG. 8 is a diagram illustrating an example of OFDM signals.

FIG. 8 is a diagram illustrating an example of OFDM signals. In OFDM signals, a pilot signal of several symbols (pilot symbols) is inserted for each data symbol of several symbols to several tens of symbols. A pilot signal is used for estimation of a transmission path or synchronous detection. Only an A-th antenna (ANT (A)) transmits pilot data for a subcarrier of pilot signal A, and other antennas transmit 0. Similarly, only a B-th antenna (ANT (B)) transmits pilot data for a subcarrier of pilot signal B, and other antennas transmit 0. Thereafter, similar processing is performed on C, D, . . . . Since there is no interference signal in a pilot signal, a real number component (I) and an imaginary number component (Q) obtained by performing complex Fourier transform result in as vectors as they are such as Si and Sj. As for data symbols, different data symbols are transmitted from two selected antennas. Information obtained on the reception side in this manner is transferred to the transmission side as antenna selection control information, and the transmission side transmits with antennas based on the control information. In the case of time division duplex (TDD), the conditions for transmission/reception are the same when time is sufficiently short, and this antennas can be selected without having the control information transferred.

Although the probability that a multistream can be transmitted increases as the number of antennas increases; however, the improvement efficiency gradually decreases as the number of antennas increases. Therefore, there are cases where a multistream cannot be transmitted with a realistic number of antennas (such as case 6 in FIG. 7B). In this case, it is impossible to separate signals, and an error rate is greatly deteriorated. Therefore, it is desirable to transmit a single stream.

Figure 9:
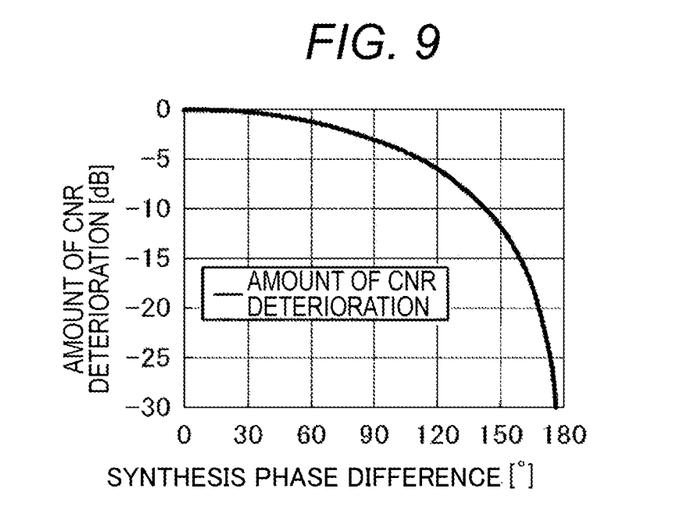
FIG. 9 is a diagram illustrating the amount of CNR deterioration with respect to the synthesis phase difference.

FIG. 9 is a diagram illustrating the amount of Carrier to Noise power Ratio (CNR) deterioration with respect to the synthesis phase difference. The horizontal axis represents the synthesis phase difference with 0° representing a case of ideal synthesis (a synthesis phase difference is 0° when Φ equals π, a synthesis phase difference is 180° when Φ equals 0). A synthesis phase difference is obtained from the best Φ calculated for antenna selection, and the amount of Carrier to Noise Ratio (C/N) degradation is subtracted from C/N for a single stream. In a case where the result is larger than a required C/N: $Th_{C/N}$, a multi stream is transmitted, and when the result is smaller, a single stream is transmitted. Here, C/N for a single stream is measured by independent pilot symbols. Therefore, the C/N of single signal transmission is obtained at each transmission antenna from transmission signals which have known information and are independent in terms of frequency or time.

Furthermore, since the required C/N varies depending on a multilevel number of quadrature amplitude modulation (QAM), adaptive modulation may be performed by setting a threshold $Th_{nQAM}$ for each multilevel number n (e.g. n=16, 64, 256) for optimization.

Figure 10A:
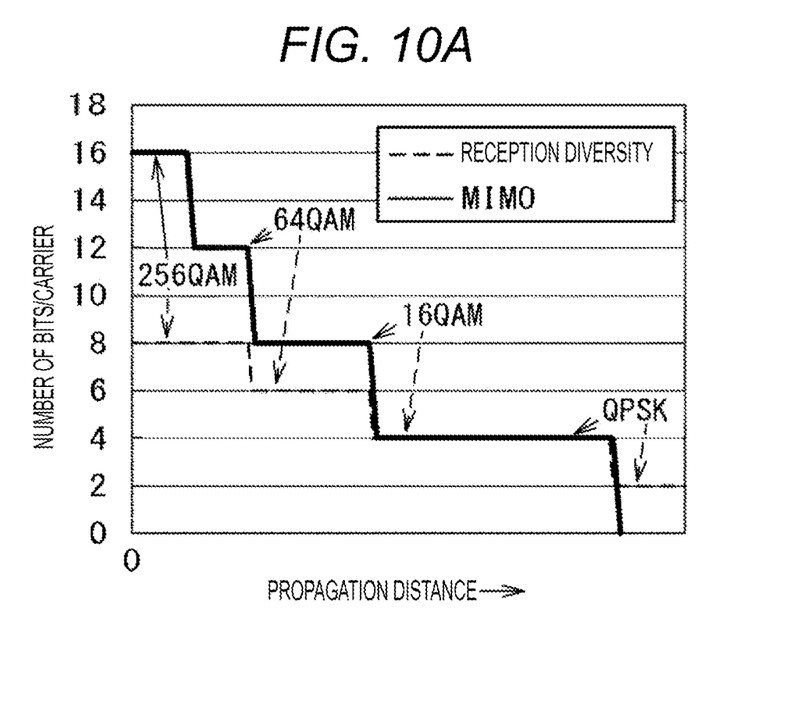
FIG. 10A is a diagram for explaining an effect of a wireless system according to an embodiment.
Figure 10B:
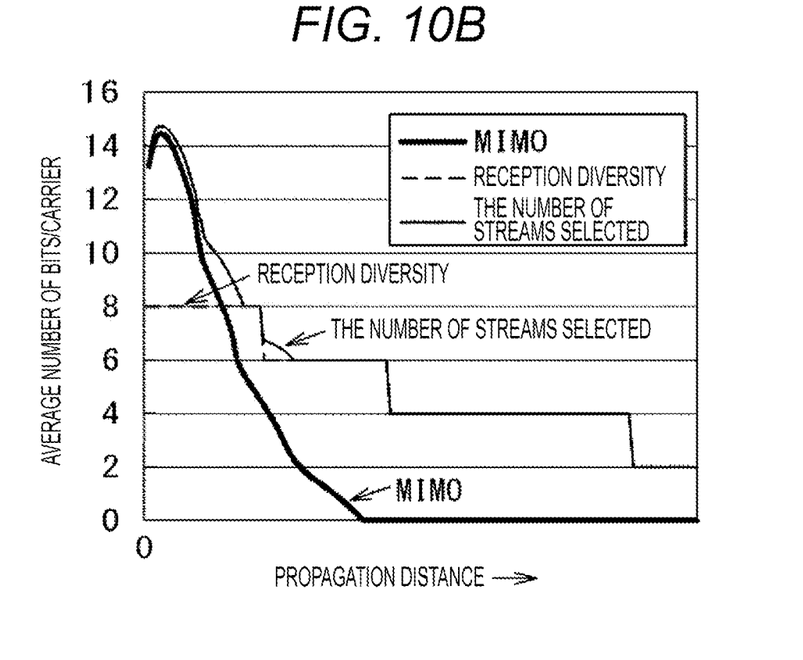
FIG. 10B is a diagram for explaining an effect of a wireless system according to an embodiment.
Figure 10C:
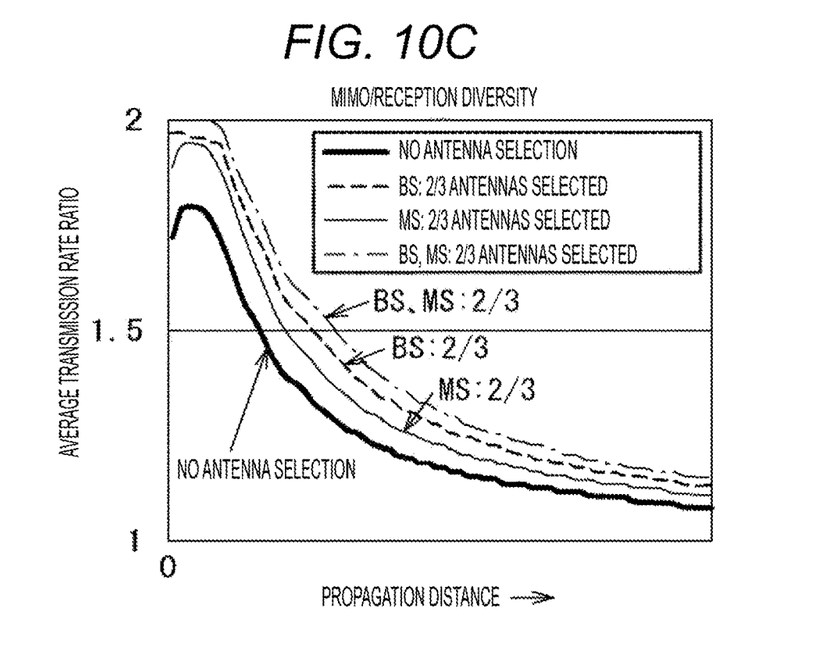
FIG. 10C is a diagram for explaining an effect of a wireless system according to an embodiment.

Next, effects of the present embodiment will be described with reference to FIGS. 10A to 10C. FIG. 10A is a diagram illustrating the transmission rate with respect to the transmission distance (number of bits/carrier). FIG. 10B is a diagram illustrating the transmission rate with respect to the transmission distance (average number of bits/carrier). FIG. 10C is a diagram illustrating the transmission rate with respect to the transmission distance (average transmission rate ratio). In FIGS. 10A to 10C comparison is made between the case of multi stream (MIMO) and the case of reception diversity (single stream) with two reception antennas. The total number of antenna elements are equal for the MIMO case and the reception diversity case. A radio wave loss in a free space is assumed depending on a transmission distance on the horizontal axis. A modulation method is quadrature amplitude modulation. Adaptive modulation that optimizes a multilevel number depending on a Carrier to Noise power Ratio (CNR) of a reception device is performed. A multilevel number is determined to be the largest multilevel number that can be transmitted from comparison with C/N determined by a multilevel number of quadrature amplitude modulation. In the case of OFDM, the vertical axes in FIGS. 10A to 10C represent values per subcarrier.

FIG. 10A represents a case of fixed communication, which is a case where the optimum antenna interval can be designed depending on the propagation distance. First to be noted is reception diversity. When a propagation distance is doubled, the CNR decreases by about 6 dB. By adaptive modulation, a difference in required CNRs of multilevel numbers (for example, 256 QAM and 64 QAM) corresponding to a difference of 2 bits is about 6 dB. Therefore, focusing on the fact that the number of bits per carrier decreases by 2 bits, a propagation distance at a point where 64 QAM is replaced by 16 QAM is twice a propagation distance at a point where 256 QAM is replaced by 64 QAM, and a propagation distance at a point where 16 QAM is replaced by QPSK is twice a propagation distance at a point where 64 QAM is replaced by 16 QAM. Next, MIMO is to be noted. Since two different transmission signals can be transmitted in MIMO, the number of bits per carrier is doubled as compared to that of the reception diversity. However, since the total number of antenna elements is equal, a spatial synthesis gain per stream decreases by −6 dB as compared to that of reception diversity. Therefore, in MIMO in which the propagation distance is decreased to ½ of that of reception diversity, it is understood that there is an effect under the condition of a multilevel number larger than or equal to 16.

FIG. 10B illustrates a case of mobile communication. The number of antennas is two for both a base station and a mobile station. The vertical axis represents the average number of bits, which is equivalent to that of FIG. 10A for reception diversity. An antenna interval for MIMO is designed to be optimum at a transmission distance that allows transmission by 256 QAM, that is, at a place relatively close to a base station. In MIMO, since the CNR deteriorates due to a synthesis phase difference in addition to a propagation loss, the average number of bits becomes smaller than that of MIMO of FIG. 10A. It can be confirmed that the average number of bits is improved by selecting the number of transmission streams (MIMO: 2 streams, reception diversity: 1 stream).

FIG. 10C illustrates a case where antenna selection of the present embodiment is applied. The horizontal axis represents the propagation distance, and the vertical axis represents the average transmission rate ratio obtained by averaging the transmission rate ratio of MIMO with respect to reception diversity over a distance between a base station (BS) and a mobile station (MS) that is within the horizontal axis. The "the number of streams selected" in FIG. 10B corresponds to "no antenna selection" in FIG. 10C. BS: 2/3 antennas selected, MS: 2/3 antennas selected, BS and MS: 2/3 antennas selected represent cases where 2×2 (2 inputs with 2 outputs) MIMO has been performed by selecting the optimum antennas at a BS or a MS or the both. In the case of selecting two antennas in the BS or the MS, it is better to select antennas at the BS. This is because the MS has a narrow antenna interval in consideration of a small-sized device such as a mobile phone, and thus the synthesis phase difference is likely to be smaller in the antenna selection at the BS in which an antenna interval can be relatively increased. Focusing on the effect of 1.5 times of increase in the transmission rate, it is understood that selecting two antennas from three antennas at the BS and the MS allows the transmission distance to be doubled as compared with the case of no antenna selection.

Figure 3A:
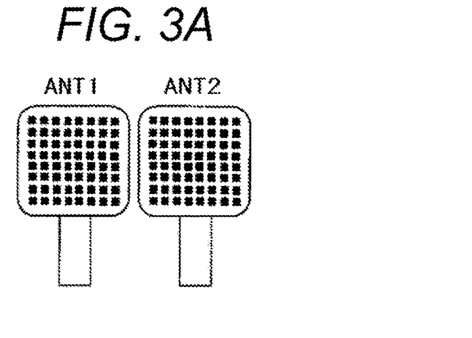
FIG. 3A is a diagram for explaining an example of antenna arrangement of the wireless device.
Figure 3B:
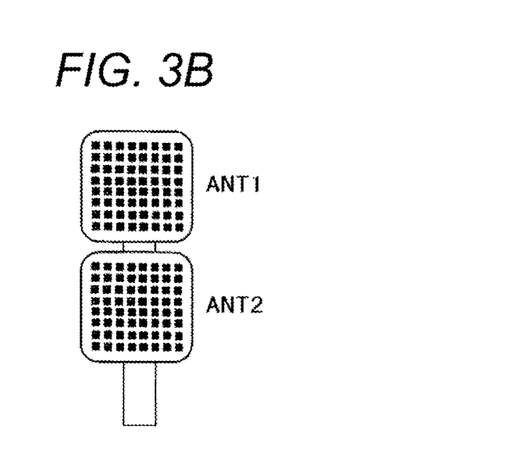
FIG. 3B is a diagram for explaining another example of antenna arrangement of the wireless device.

Next, antenna arrangement of a wireless device according to the embodiment will be described with reference to FIGS. 3A and 3B. FIGS. 3A and 3B are diagrams illustrating antenna arrangements of a wireless device according to the embodiment. A plurality of antenna elements is included in order to perform beamforming. FIGS. 3A and 3B are merely examples, and one antenna unit of MIMO has 64 elements (=8×8) arranged at intervals of a half a wavelength λ/2. FIG. 3A is an example in which antenna units are arranged in the lateral direction (parallel to the ground). FIG. 3B is an example in which the antenna units are arranged in the height direction (orthogonal to the ground).

Figure 4A:
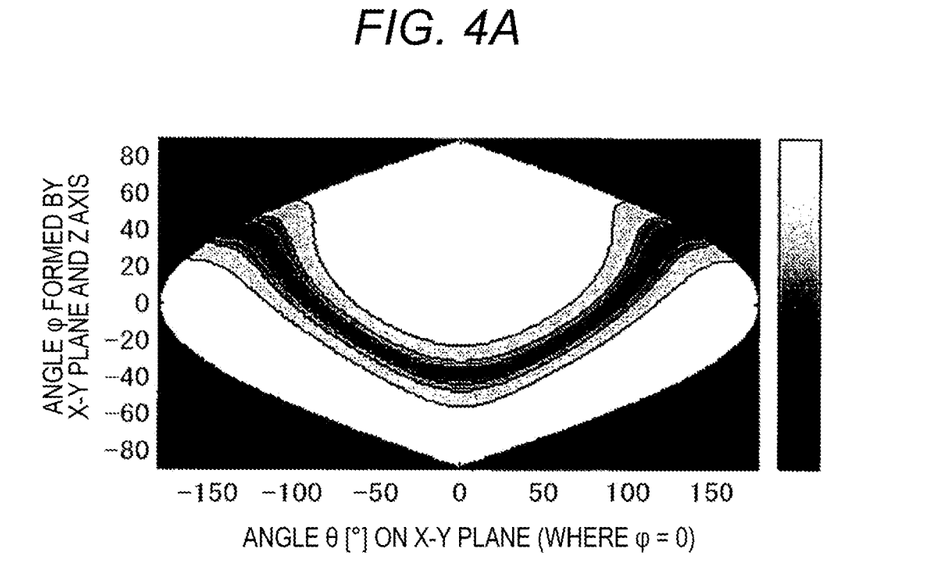
FIG. 4A is a diagram for explaining a synthesis phase difference in the antenna arrangement of FIG. 3B.
Figure 4B:
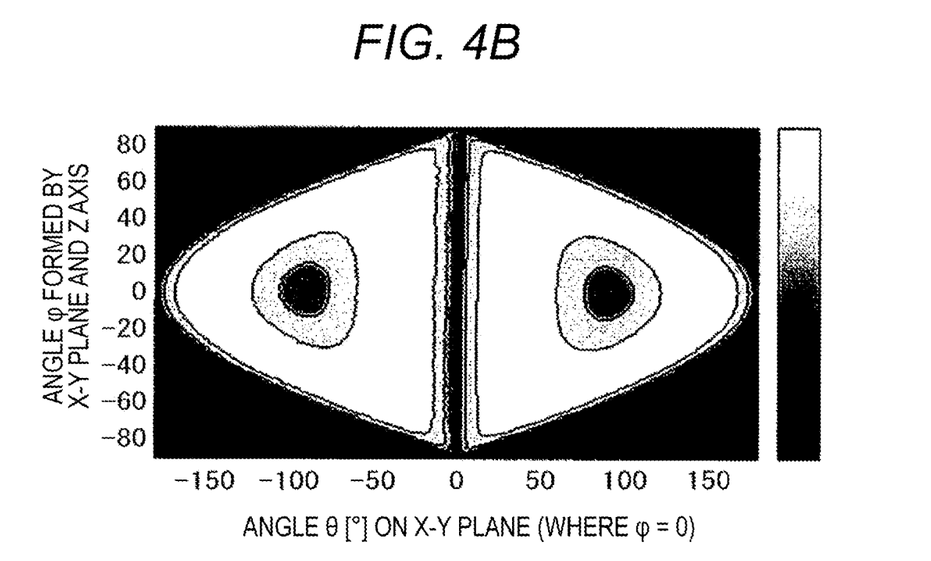
FIG. 4B is a diagram for explaining a synthesis phase difference in the antenna arrangement of FIG. 3A
Figure 4C:
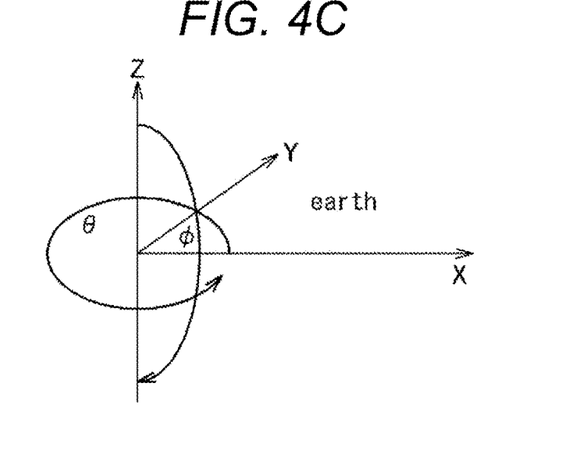
FIG. 4C is a diagram illustrating coordinate systems of FIGS. 4A and 4B

The direction of antenna arrangement and a synthesis phase difference will be described with reference to FIGS. 4A, 4B, and 4C. FIG. 4A represents the synthesis phase difference when the antennas are arranged in the vertical direction (arrangement in FIG. 3B). FIG. 4B represents the synthesis phase difference when the antennas are arranged in the horizontal direction (arrangement in FIG. 3A). FIG. 4C is a diagram illustrating the coordinate systems of FIGS. 4A and 4B. A base station with fixed antenna positions and a mobile station (such as a mobile phone) with changing antenna positions are assumed. As illustrated in FIG. 4C, a line connecting the base station and the mobile station is placed on the X axis to be parallel to the ground. A direction parallel to the ground and orthogonal to the X axis is represented by the Y axis. A direction perpendicular to the X-Y plane (perpendicular to the ground) is represented by the Z axis. The horizontal axes of FIGS. 4A and 4B represent the angle θ (±180°) on the X-Y plane of the fourth antenna (ANT 4) when the third antenna (ANT 3) of the mobile station is fixed at the origin. The vertical axes in FIGS. 4A and 4B represent the angle φ (±90°) formed by the fourth antenna (ANT 4) and the X-Y plane when the third antenna (ANT 3) of the mobile station is fixed at the origin. Ideal synthesis is indicated in a lighter color. A case where separation is impossible is indicated in a darker color. Since the data has been acquired such that the position of the fourth antenna (ANT 4) is uniformly distributed, FIG. 4 has a shape close to an ellipse. Since the positional relationship between the second antenna (ANT 2) and the third antenna (ANT 3) and the fourth antenna (ANT 4) changes in FIGS. 4A and 4B, different characteristics are illustrated.

Figure 5A:
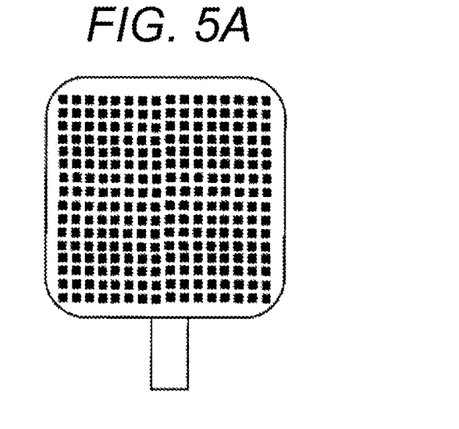
FIG. 5A is a diagram for explaining a configuration of an antenna according to an embodiment.
Figure 5B:
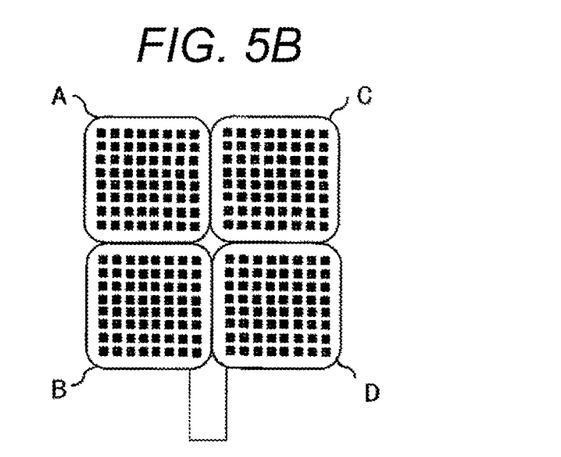
FIG. 5B is a diagram for explaining the configuration of the antenna according to the embodiment

Next, a configuration of an antenna of the wireless device according to the embodiment will be described with reference to FIGS. 5A and 5B. FIG. 5A is a diagram illustrating an antenna configuration. FIG. 5B is a diagram illustrating a configuration of sub arrays. In the present embodiment, an antenna configuration of 256 elements (16×16) as illustrated in FIG. 5A is used, and a configuration of sub arrays of 64 elements (8×8) each as illustrated in FIG. 5B (four sub arrays as an example) is adopted. Therefore, an antenna (ANT) includes a subarray antenna A, a subarray antenna B, a subarray antenna C, and a subarray antenna D. From among them, two antennas which approximate ideal synthesis are selected for transmission.

Figure 6A:
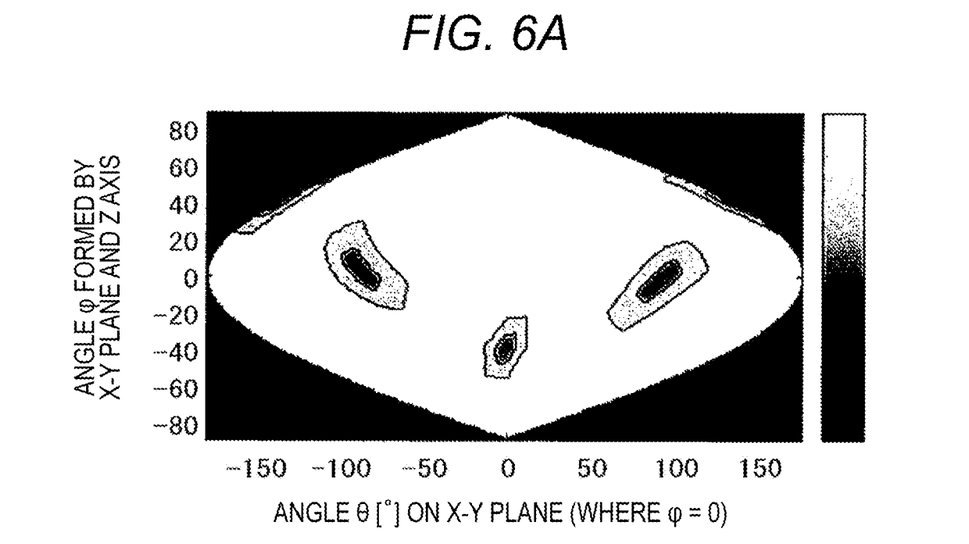
FIG. 6A is a diagram illustrating characteristics in the case where the antenna of FIG. 5B is applied to a base station antenna.
Figure 6B:
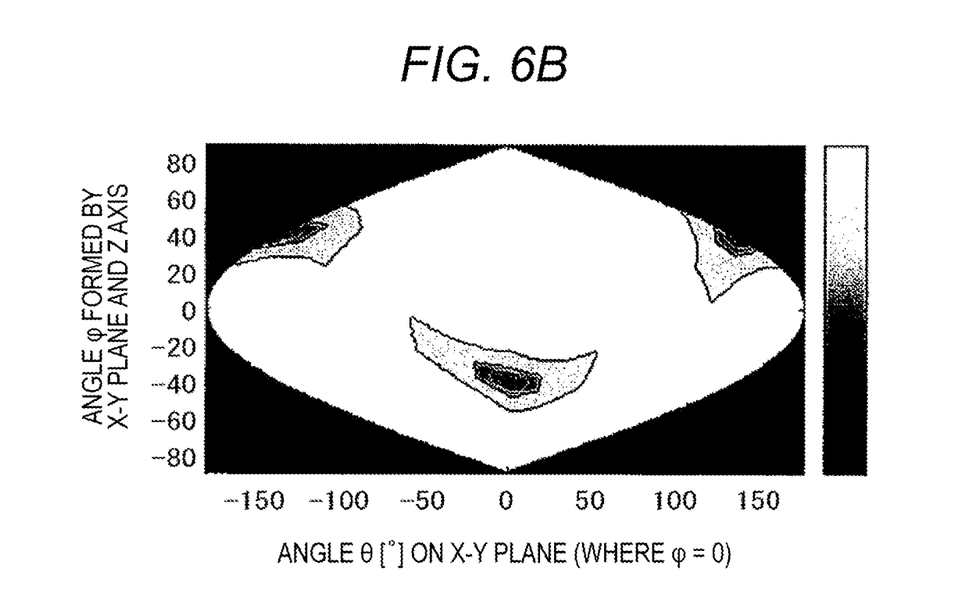
FIG. 6B is a diagram illustrating characteristics in the case where the antenna of FIG. 5B is applied to a mobile station antenna.

FIGS. 6A and 6B are diagrams for explaining the effect of subarray antennas. In FIG. 6A, characteristics in the case where two antennas are selected from the subarray antennas A, B, and C in FIG. 5B as base station antennas are illustrated. It can be understood that the probability that a multi stream can be transmitted is greatly increased since antennas close to the ideal synthesis in FIGS. 4A and 4B are selected and the number of combinations of the subarray antennas B and C of FIG. 5B also increases. In FIG. 6B, characteristics are illustrated in the case where two antennas are selected from the subarray antennas A, B, and C in FIG. 5B as mobile station antennas. It is understood that a similar result to that of the base station antennas is obtained. This result is an exemplary examination assuming a radio frequency as the millimeter wave band, the base station antenna interval as several tens of centimeters to several meters, and the mobile station antenna interval as several centimeters to several tens of centimeters in consideration of its small size. It is desirable to perform appropriate designing depending on a radio frequency or a transmission distance as in the prior art.

In the case where a mobile station is a small wireless device such as a cellular phone, the positions of antennas are freely arranged in a three-dimensional space. Therefore, it is clear from FIGS. 4A and 4B and FIGS. 6A and 6B that the effect of antenna selection is increased not by a linear array in a single direction of the horizontal direction or the vertical direction with respect to the ground but by arraying in the both directions. In this embodiment, implementation is put in place by configuring the subarray antennas in the horizontal and the vertical directions.

The effect of the present embodiment is enhanced by flexibly configuring antenna elements used without limiting to the subarray antennas. In addition, since the number of antenna elements that transmit the same signal can be freely selected, the power can be easily adjusted by increasing the number of antenna elements, in other words, increasing the number of events of spatial synthesis when a singlestream is transmitted. Furthermore, by providing an appropriate phase difference to signals input to respective antenna elements, direction control of a beam directivity can be easily performed depending on the position of a mobile station.

Although the invention made by the present inventor has been specifically described based on the embodiments, it is understood without saying that the present invention is not limited to the embodiments described above and that various modifications may be included.

REFERENCE SIGNS LIST

10 Wireless communication system
100 Wireless communication system
110 First wireless device
120 Second wireless device
121 Phase shifter
122 Phase shifter
123 Adder
124 Adder

The invention claimed is:

1. A wireless communication system, comprising:
a first wireless device having a plurality of antennas for performing wireless communication; and
a second wireless device having a plurality of antennas,
wherein at least one of the first wireless device or the second wireless device selects two antennas from among three or more antennas and performs 2×2 multiple-input multiple-output (MIMO) communication,
wherein a combination of a plurality of transmission antennas and a plurality of reception antennas are selected, the combination allowing $\phi$ to be closest to $\pi$ radians,
wherein the $\phi$ represents an absolute value of an angle obtained by subtracting $\phi 2$ from $\phi 1$,
wherein the $\phi 1$ represents an angle formed by signal vectors transmitted from an i-th and a j-th transmission antennas of the first wireless device on an orthogonal plane on which a reception signal of a k-th reception antenna of the second wireless device is quadrature-detected or demodulated,
wherein the $\phi 2$ represents an angle formed by the signal vectors transmitted from the i-th and the j-th transmission antennas of the first wireless device on an orthogonal plane on which a reception signal of an l-th reception antenna of the second wireless device is quadrature-detected or demodulated, and
wherein parameters "i" and "i" in the i-th and the i-th transmission antennas are integer values greater than one which identify the transmission antennas respectively,
wherein in the transmission antennas, the i-th transmission antenna does not overlap with the i-th transmission antenna because each i-th or i-th is an ordinal number in the transmission antennas respectively,
wherein parameters "k" and "l" in the k-th and the l-th reception antennas are integer values greater than one which identify the reception antennas respectively, and
wherein in the reception antennas, the l-th reception antenna does not overlap with the k-th reception antenna because each k-th or l-th is an ordinal number in the reception antennas, respectively.

2. The wireless communication system according to claim 1,
wherein a single signal transmission is performed in a case that a Carrier to Noise Ratio (C/N) of MIMO communication, which is calculated by each of the transmission antennas of the first wireless device by subtracting an amount of C/N deterioration obtained from a value of $\phi$ which is closest to $\pi$ radians from C/N of single signal transmission obtained from transmission signals which have known information and are independent in terms of frequency or time, and is smaller than a predetermined C/N set on a basis of a multilevel number of quadrature amplitude modulation.

3. The wireless communication system according to claim 2,
wherein the multilevel number of the quadrature amplitude modulation is determined to be a largest multilevel number that can be transmitted from a comparison with C/N determined by the multilevel number of the quadrature amplitude modulation, and
wherein the predetermined C/N is set to be a C/N of a smallest multilevel number.

4. The wireless communication system according to claim 1,
wherein a plurality of three-dimensionally arranged antennas are used in order to impart directivity to a transmission signal or a reception signal, and
wherein positions of the plurality of three-dimensionally arranged antennas are changed by a combination of both horizontal and vertical directions.

5. The wireless communication system according to claim 2,
wherein a plurality of three-dimensionally arranged antennas are used in order to impart directivity to a transmission signal or a reception signal, and
wherein positions of the plurality of three-dimensionally arranged antennas are changed by a combination of both horizontal and vertical directions.

6. The wireless communication system according to claim 3,
wherein a plurality of three-dimensionally arranged antennas are used in order to impart directivity to a transmission signal or a reception signal, and
wherein positions of the plurality of three-dimensionally arranged antennas are changed by a combination of both horizontal and vertical directions.

7. The wireless communication system according to claim 1,
wherein a plurality of multi-element antennas are used in order to impart directivity to a transmission signal or a reception signal, and
wherein positions of the plurality of multi-element antennas are changed by a combination of elements used for transmission or reception.

8. The wireless communication system according to claim 2,
wherein a plurality of multi-element antennas are used in order to impart directivity to a transmission signal or a reception signal, and
wherein positions of the plurality of multi-element antennas are changed by a combination of elements used for transmission or reception.

9. The wireless communication system according to claim 3,
wherein a plurality of multi-element antennas are used in order to impart directivity to a transmission signal or a reception signal, and
wherein positions of the plurality of multi-element antennas are changed by a combination of elements used for transmission or reception.

10. The wireless communication system according to claim 4,
wherein a plurality of multi-element antennas are used in order to impart directivity to a transmission signal or a reception signal, and
wherein positions of the plurality of multi-element antennas are changed by a combination of elements used for transmission or reception.

11. The wireless communication system according to claim 5,
wherein a plurality of multi-element antennas are used in order to impart directivity to a transmission signal or a reception signal, and
wherein positions of the plurality of multi-element antennas are changed by a combination of elements used for transmission or reception.

12. The wireless communication system according to claim 6,
wherein a plurality of multi-element antennas are used in order to impart directivity to a transmission signal or a reception signal, and
wherein positions of the plurality of multi-element antennas are changed by a combination of elements used for transmission or reception.

* * * * *